United States Patent [19]

Lance

[11] 4,343,066
[45] Aug. 10, 1982

[54] TUBE CLAMP

[75] Inventor: Mark A. Lance, Pascoe Vale Sth, Australia

[73] Assignee: Illinois Tool Works, Chicago, Ill.

[21] Appl. No.: 191,587

[22] Filed: Sep. 29, 1980

[30] Foreign Application Priority Data

Oct. 15, 1979 [AU] Australia .................... PE0930

[51] Int. Cl.³ ............................................. A22B 5/00
[52] U.S. Cl. .................................... 17/1 R; 24/248 B
[58] Field of Search ................... 17/1 R, 1 C, 1 S, 43; 24/248 B

[56] References Cited

U.S. PATENT DOCUMENTS

| 293,564 | 2/1884 | Collins | 24/248 B |
| 637,068 | 11/1899 | Bang | 24/248 B |

FOREIGN PATENT DOCUMENTS 609780  2/1935  Fed. Rep. of Germany ....... 17/1 R

*Primary Examiner*—Willie G. Abercrombie
*Attorney, Agent, or Firm*—Jerold M. Forsberg; Thomas W. Buckman; Jack R. Halvorsen

[57] ABSTRACT

The invention relates particularly to clamps for closing the weasands of slaughtered animals such as sheep and cattle and consisting of a base member and a strap member for clamping the weasand against the base member, the base member having an intermediate or middle part which is of arcuate shape in transverse cross-section—that is to say, in a direction transverse to the longitudinal direction of the weasand to be closed—and tapering or inclined forwardly in that longitudinal direction, and the strap member having means for securing its outer or free end to the base so as to grip a weasand tightly against the arcuately shaped middle part of the base and thereby inhibit the flow of ingesta. By reason of the tapered or inclined shape of the arcuately shaped middle part of the base the clamp, once it has been secured to the weasand, may be slid forwardly along the weasand to a position close to the stomach of the slaughtered animal but will strongly resist any return movement due to internal pressure in the stomach and/or weasand. It is preferred that the two parts be made as a unitary moulding of a suitable plastic material.

13 Claims, 10 Drawing Figures

TUBE CLAMP

The present invention relates to a tube clamp or clip and it refers particularly, but not exclusively, to a clamp or clip for use in closing the weasand of a slaughtered animal, such as sheep or cattle, during the subsequent gutting and skinning operations.

It is the general practice, after slaughtering of an animal such as a sheep or a bovine animal, to suspend the carcass in an upside-down position, and it is desirable that the weasand, that is the tube connecting the throat and stomach of the animal, should be closed off after the animal has been slaughtered and before it is inverted so as to prevent the contents of the stomach spilling onto the carcass and/or ground when the animal carcass is suspended, whereby to reduce the likelihood of spoilage of the meat. In the past it has been the practice to close the weasand by tying an elasticised cord or the like around the weasand itself. However, such a procedure has been found to be unduly cumbersome, time consuming and not entirely satisfactory by reason of such a tied arrangement being susceptible to unwanted contamination.

It is also desirable that the means employed for closing the weasand should be capable of being applied thereto without first cutting the weasand.

It has been proposed to provide a weasand clamp or clip made of a plastics material and having two hinged arms for engagement transversely of the weasand so as to grip it between them, the two arms having interfitting grooves and ribs which extend transversely of the weasand so as to grip the weasand in such manner that it is tightly closed to prevent passage of stomach contents. Such a construction is described in our pending Australian Patent Application No. 36968/78 lodged June 8, 1978.

However, it has been found in practice that if the weasand is closed at a position near the throat—which is the convenient position for applying such a clip or clamp—stomach contents will accumulate in the weasand when the carcass is inverted and the pressure of such stomach contents in the weasand may cause the weasand to fracture, with consequent contamination of the carcass. That is a problem with cattle, in particular.

It is therefore desirable that the clamping means or clip for closing the weasand should be capable of being moved along the weasand from the place of its application towards the stomach, so that said clamping means may be positioned close to the stomach to thereby prevent accumulation of stomach contents in and fracture of the weasand.

It is also desirable that the weasand clamp or clip should be of such construction that the pressure of the stomach contents will not cause it to slide down the weasand away from the stomach. That is, the weasand clamp should stay in its position as close to the stomach as it is conveniently possible to position it.

It has also been proposed—see our Australian Patent Application No. 45727/79 lodged Apr. 2, 1979—to provide a tube clamp for closing or substantially closing a flexible tube, such as the weasand of an animal, including a tubular or quasi-tubular member having a slot extending through the side wall from one end to the other so as to enable the clamp to be applied to a tube to be closed, and a hinged flap at one end of or within the tubular member. The hinged flap is adapted to press the tube between the edge of the flap and the inside wall of the tubular member so as to effect a closure, or substantial closure, of the tube.

It is an object of this invention to provide a clamp or clip for effectively closing a tube, such as the weasand of a slaughtered animal, which will be of economical construction and which may be applied conveniently and rapidly. Another object is to provide a clamp or clip which may be applied to a tube at a position between its opposite ends, and of being moved in one direction along the tube but which will resist movement in the opposite direction.

A further object is to provide a weasand clamp or clip which will be effective when used with cattle. Yet another object is to provide a weasand clip which may be used for clamping weasands of a substantial range of sizes.

The invention devised with these and other objects in view provides a tube clamp or clip having a tapered or inclined surface—that is to say, inclined in relation to the longitudinal direction of the tube with which it is to be used, and a strap for clamping the tube against that tapered or inclined surface whereby to close or substantially close the tube and, when the tube is a weasand, inhibit the flow of ingesta through the weasand past the clip. As the tube is clamped on a tapered surface the clip may be moved along the tube in one direction but, it is believed, will not tend to slide in the opposite direction.

Preferably, the tapered or inclined surface is of partial conical shape, such as a truncated conical segment, and there are two opposite side extensions of the tapered surface, one such extension merging into the strap, whereby the clip is of unitary construction. One of the strap and the other side extension has a slot for receiving and retaining a detent on the other member.

To provide for economy of production the clip is preferably designed to be moulded in a two-piece die.

In order that the invention may be clearly understood and readily put into practical effect there shall now be described in detail preferred constructions of a clamp means in accordance with the invention. The following description is given by way of non-limitative example only and is with reference to the accompanying drawings, wherein.

Figures 4, 10:
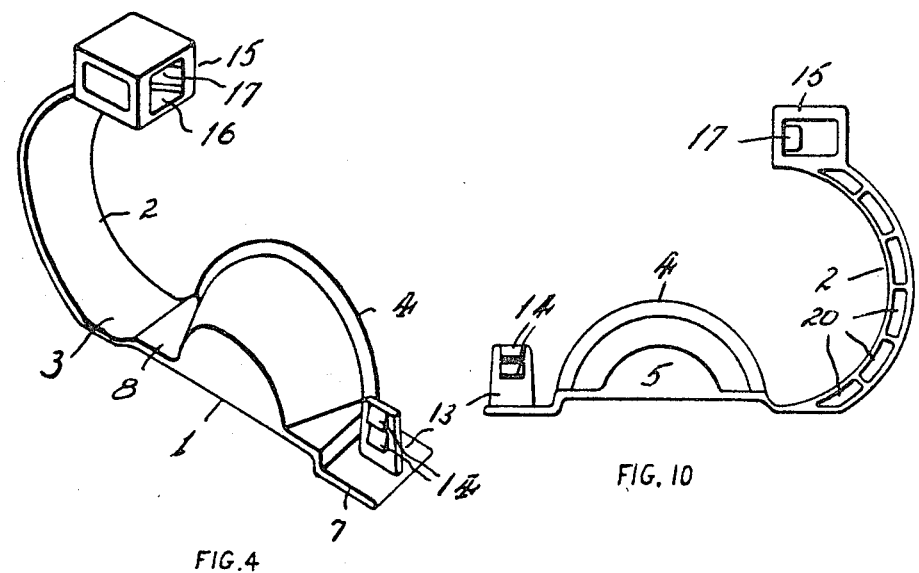
FIG. 4 is a top perspective view of a second embodiment of clamp means made in accordance with the invention.
Figures 5, 6:
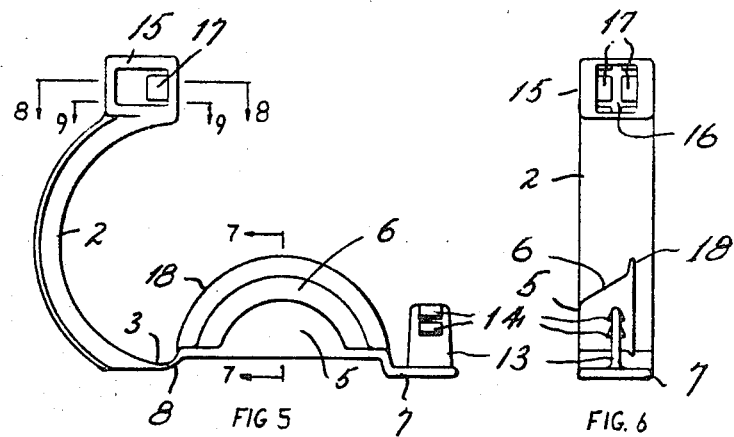
FIG. 5 is an end elevation of the clamp means of FIG. 4.
FIG. 6 is a side elevation of the clamp means of FIGS. 4 and 5.
Figures 7, 8, 9:
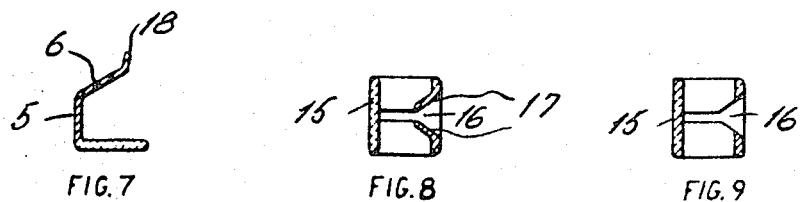

FIGS. 7, 8 and 9, respectively, are cross-sections on the lines and in the directions of the arrows 7—7, 8—8 and 9—9 of FIG. 5; and FIG. 10 is an end elevation of a clamp similar to that shown in FIGS. 4, 5 and 6 but incorporating a minor modification.

Figure 1:
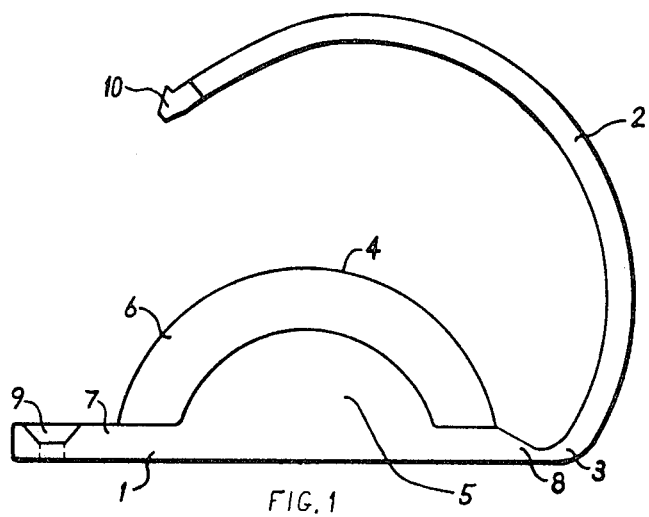
FIG. 1 is an end view of a first embodiment of a clamp means in accordance with the present invention.
Figure 2:
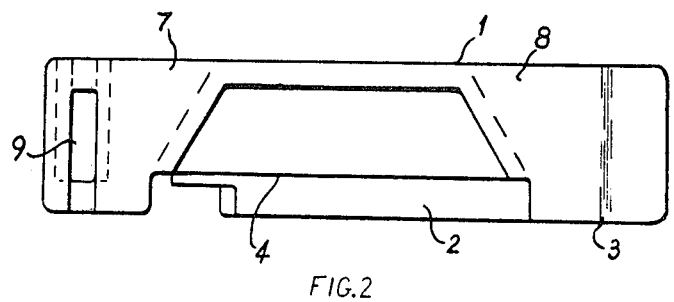
FIG. 2 is an underside plan view of the embodiment illustrated in FIG. 1.
Figure 3:
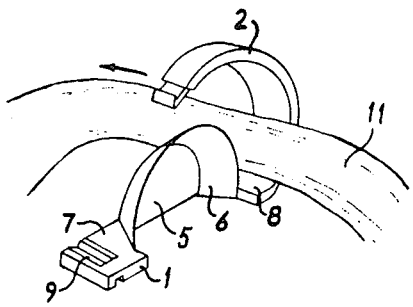
FIG. 3 illustrates the mode of application to the weasand of a slaughtered animal of the clamp means shown in FIGS. 1 and 2.

The tube clamp illustrated in FIGS. 1, 2 and 3 has two clamping members 1 and 2 of unitary construction, moulded of a suitable plastics material such as moisture conditioned nylon 66, natural acetyl or polyethylene. The two members 1 and 2 join together at the hinge location 3 and the member 1 constitutes a base and the member 2 constitutes a strap.

The clamping member 1 has an intermediate or middle part 4 having the shape of a truncated conical segment, with a flat front end wall 5 of substantially semi-circular shape and a somewhat conical skirt 6. At opposite sides of that middle part 4 are side extensions 7 and 8 which, with the diametral part of the end wall 5, form the base of the clamp member. The side extension 7 has a slot 9 which is chamfered on its upper side. For convenience in manufacture the slot 9 is extended forwardly on the upper side of the side extension 7 and rearwardly on the underside thereof.

The side extension 8 is extended to form the clamping member or strap 2, which is of arcuately curved configuration of substantially the same width as the base 1 with the front and rear edges rounded. It has at its outer end a barbed detent or latching member 10 of a width to fit in the slot 9 through the side extension 7 and is adapted to engage the underside of that extension so as to hold the strap 2 close to the arcuate larger edge of the conical skirt 6, whereby to clamp a flexible tube between said edge and the strap 2. The operation of the clamping member is illustrated in FIG. 3.

By reason of the somewhat conical shape of the part 4, when the strap 2 has its detent 10 engaged in the slot 9 so as to clamp the weasand 11 in closed or substantially closed position the clamping member may be moved along the weasand in the direction of the arrow in FIG. 3 by a suitable rodding tool, not shown, until it is close to the stomach of the slaughtered animal. When so positioned and the carcass is inverted the clamp will inhibit passage of the stomach contents past the clamp down the weasand, and it is believed the weasand will not tend to slide backwards down the weasand due to the internal pressure exerted by the stomach contents.

Reference is now made to the illustrations of FIGS. 4 to 9 inclusive. The general construction of the clamping means is the same as illustrated in FIGS. 1 to 3 but the latching means for the end of the strap 2 are reversed, with the detent in the side extension 7 and the slot is in a housing provided on the outer or free end of the strap.

Thus, the clamp has the truncated conical segment 4, with the two side extensions 7 and 8, and the strap 2. However, instead of the slot 9 in the extension 7 there is an upstanding projection 13 having two teeth or barbs 14 on each side. The strap 2 has at its outer or free end a hollow housing 15 having at its front end an opening 16 with two inwardly directed leaves 17 which are adapted to engage selectively the teeth or barbs 14 of the projection 13. It is clear that if the housing 15 is engaged over the upper end part of the projection 13 so that the leaves 17 engage behind the upper of the two pairs of barbs 14 the strap 2 will not be engaged with the conical skirt 6 as tightly as it would be if the housing 15 were pushed further on to the projection 13 to engage the leaves 17 behind the lower pair of barbs 14.

In this construction the truncated, segmental-conical skirt has an outwardly-extending ledge or flange 18, as shown particularly in FIGS. 6 and 7 and the strap 2 is shaped to apply pressure substantially evenly to the skirt 6.

FIG. 10 illustrates a further modified construction wherein the strap 2 has a number of openings 20 therein.

It is to be understood that other minor modifications in details of design and construction may be made without departing from the ambit of the invention as defined by the appended claims.

In those claims the word "closing" is used to mean closing to an extent to prevent or largely prevent the flow of solid matter through the flexible tube which is closed but is not intended to imply necessarily that the closure of the tube is sufficiently tight to prevent the passage of air or other fluids.

What I claim is:

1. A clamp, for closing a flexible tube, comprising a base and a strap, said base having a projecting generally arcuate surface inclined in relation to the longitudinal direction of the tube to be closed, said strap adapted for clamping the tube against said inclined surface, and means for securing the strap in its clamping position relative to the inclined surface wherein said strap generally conforms to said arcuate surface when said strap is secured in the clamping position.

2. A clamp as claimed in claim 1 wherein the inclined surface is substantially the shape of a truncated conical segment.

3. A clamp as claimed in claim 1 wherein the inclined surface has at one side an extension having means for engagement by the outer end of the strap to hold said strap in its clamping position.

4. A clamp as claimed in claim 3 wherein the strap extends from the side of the inclined surface opposite said side extension.

5. A clamp as claimed in claim 3 wherein the outer end of the strap has a detent engageable in a slot in said extension.

6. A unitary clamping device for closing a flexible tube comprising a base and a strap, said base having a first side extension and a second side extension and a projecting generally arcuate clamping surface, said strap having a hinged side extension attached to said first side extension and a distal end, said distal end and said second side extension each having means adapted to cooperate for securing said distal end of, said strap relative to said base, whereby when said distal end is secured said strap is secured relative to said base and generally conforms to said generally arcuate clamping surface thereby closing a flexible tube positioned between said clamping surface and said strap.

7. A clamping device as claimed in claim 6, wherein said second side extension has a slot and the outer end of the strap has a detent engageable in said slot.

8. A clamping device as claimed in claim 6, wherein the outer end of the strap has a housing with at least one inwardly extending leaf and said other side extension has an upstanding projection with at least one barb, the projection being engageable in the housing in such a manner that the at least one barb will be engaged by the at least one leaf to hold the housing in position relative to the projection.

9. A clamping device as claimed in claim 6, wherein the strap has several openings in its length.

10. A clamping device as claimed in claim 6, wherein the clamping surface has the shape of a truncated conical segment.

11. A clamping device as claimed in claim 10, wherein said truncated conical segment is a flexible skirt.

12. A clamping device as claimed in claim 10 wherein said truncated conical segment is supported along one edge by a substantially semi-circular wall.

13. A clamping device as claimed in claim 6 wherein said device is molded of a plastic material and said hinged end and said first side extension are connected by an area of reduced thickness thereby creating a living hinge due to the inherent flexibility and resiliency of the plastic material.

* * * * *